Nov. 28, 1961   K. A. RIEDEL ET AL   3,010,371
MACHINE TOOL TRANSFER MECHANISM
Filed March 10, 1958   5 Sheets-Sheet 5

INVENTOR.
Kurt A. Riedel
John A. Hansen
BY
Elroy J. Wutschel
Attorney

United States Patent Office 3,010,371
Patented Nov. 28, 1961

3,010,371
MACHINE TOOL TRANSFER MECHANISM
Kurt A. Riedel, Milwaukee, and John A. Hansen, Greendale, Wis., assignors to Kearney & Trecker Corporation, West Allis, Wis., a corporation of Wisconsin
Filed Mar. 10, 1958, Ser. No. 720,111
9 Claims. (Cl. 90—21)

This invention relates generally to machine tools and more particularly to an improved transfer mechanism for a multiple station milling machine.

A principal object of the invention is to provide an improved mechanism for transferring uniformly shaped work carrying pallets to their respective operating positions in a multiple station milling machine.

Another object of the invention is to provide a transfer mechanism that can be readily removed from or attached to a multiple station machine tool.

Another object of the invention is to provide an improvide telescoping type transfer mechanism adapted to position workpieces in spaced apart working positions.

Another object of the invention is to provide an improved longitudinally operable transfer mechanism having transversely movable pallet engaging elements that are transversely engageable and retractable with work carrying pallets, and that are not moved above the work supporting surface of the pallets during any portion of the transfer cycle.

Another object of the invention is to provide an improved transfer mechanism that is operable to effect transfer movement of workpieces in either direction of movement.

A further object of the invention is to provide an improved machine tool transfer mechanism adapted to transfer work supporting pallets to different working stations, in combination with improved coordinately operable means for precisely locating and clamping the work pallets in their respective operating stations.

A further object of the invention is to provide a unitary, telescoping type machine tool transfer mechanism in which the cooperating working parts are located exteriorly of an associated multiple station machine tool.

A still further object of the invention is to provide an improved telescoping arrangement in a transfer mechanism for a multiple station machine tool incorporating improved control means for regulating the speed of transfer movement to precisely position associated work carrying pallets in their respective operating stations.

According to this invention, a multiple station machine tool having a plurality of longitudinally spaced apart tool spindles is provided with a corresponding number of indexable support members respectively associated therewith. Positioning and clamping means are so disposed in each of the indexable support members as to position and clamp a removable work supporting pallet in operative relationship to one of the tool spindles. The arrangement is such that a plurality of work pallets are simultaneously positioned and clamped to the respective indexable support members for subsequent indexing movement in relation to the tool spindles. At the completion of a predetermined sequence of machining operations, the indexable support members are indexably returned to their respective starting positions, and the pallets unclamped prior to being longitudinally indexed or transferred to their next station. To move the work pallets longitudinally, there is provided an improved transfer mechanism comprising essentially a plurality of selectively retractable pallet engaging forks slidably carried for longitudinal movement by a guideway structure removably secured to the machine. A rotatable and longitudinally movable transfer bar is operatively and telescopingly interconnected between the pallet engaging forks. At the start of a transfer cycle, power driven means are connected to rotate the transfer bar for moving the forks transversely into engagement with the pallets, after which the transfer bar is moved axially to advance the work pallets to the next working stations, with the last pallet being moved into an unloading station. After this, as a continuous part of the transfer cycle, the transfer bar is rotated to retract the forks; the pallets are located and clamped; and the transfer bar is moved longitudinally in a reverse direction to reposition the forks for the next transfer cycle, the first fork being then located to engage a pallet advanced into a ready station by means of an associated closed circuit conveyor system. The opposite end of the closed circuit conveyor system is connected to receive another work pallet from the unloading and loading station.

The foregoing and other objects of the invention which will become more fully apparent from the following detailed description of machine structure and an electrohydraulic system exemplifying preferred embodiments thereof, may be achieved by the particular structure and control system described herein in connection with the accompanying drawings, in which.

Figure 1:
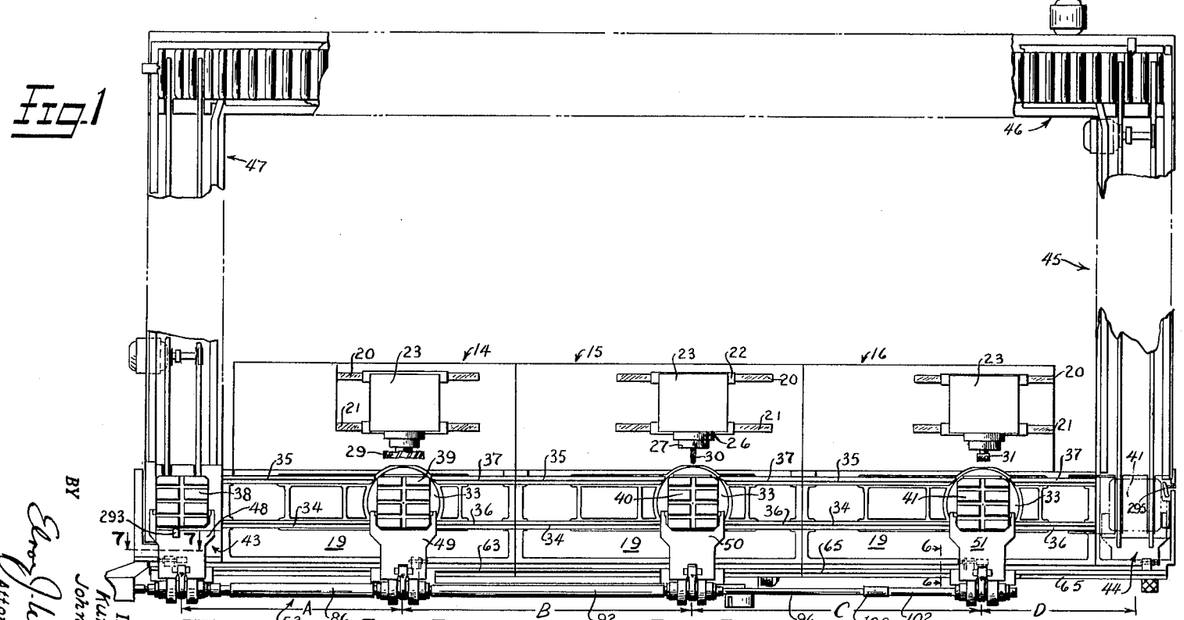
FIGURE 1 is a plan view of a multiple station machine tool in combination with an improved work transfer mechanism having its opposite ends interconnected with a closed circuit conveyor system.

Referring to the drawings, there are shown in FIG. 1 three milling machines 14, 15 and 16 of generally similar construction that are secured to each other in parallel end to end relationship to constitute a multiple station machine tool. Each of the milling machines is provided with a forwardly extending frame or bed 19 presenting on its rearward portion a pair of parallel spaced way surfaces 20 and 21. A longitudinally movable support member 22 slidably carried on way surfaces 20, 21 is, in turn, arranged to carry a vertically movable spindle head 23. An axially movable quill 26 slidably supported by the spindle head 23 for horizontal movement in well known manner is disposed to rotatably support a power driven tool spindle 27. By means of this arrangement, a milling cutter secured to the tool spindle 27 is carried for selective movement in three mutually perpendicular planes relative to an indexable rotary table 33 journalled on the forward central portion of the bed 19.

As shown in FIG. 1, the tool spindles respectively associated with machines 14, 15 and 16 are provided with a large milling cutter 29, an end mill 30, and a smaller diameter milling cutter 31. The three different milling cutters shown for illustrative purposes are adapted to perform a different type operation on workpieces (not shown) that may be respectively and sequentially supported on each of the rotary tables 33 respectively associated with the machines 14, 15 and 16. For transferring a workpiece into operative position upon a rotary table 33, each of of the machines 14, 15 and 16 is respectively provided with way surfaces 34, 35 and 36, 37 spaced apart on either side of the rotary tables. The arrangement is such that with the machines 14, 15 and 16 secured together as shown in FIG. 1, the way surfaces 34, 35 and 36, 37 constitute a continuous transfer pathway for transferring work supporting pallets 38, 39, 40 and 41. Inasmuch as four work supporting pallets are transferred simultaneously, it will be apparent that the pallet 38 is transferred from a ready station 43 to an operating position upon the worktable 33 associated with the first machine number 14. Likewise, pallets 39 and 40 are moved into positions upon the rotary tables associated with machines 15 and 16. At the same time, during transfer movement, the work pallet 41 which is shown in the last operating station carried by the rotary table associated with machine 16 is moved to a loading and unloading station 44. After a pallet has been unloaded from the station 44, another pallet carrying workpiece is placed thereon in a position to be moved by a chain type conveyor 45. The right chain conveyor 45 is connected to move pallets to a rear power driven roller conveyor 46, that is in turn connected via a power driven chain conveyor 47 to advance pallets to the ready station 43. The conveyors 45, 46 and 47 cooperate to constitute a closed circuit conveyor system for moving a series of work carrying pallets from the loading and unloading station 44 to the ready station 43 and may be of any well known standard type.

Figure 9:
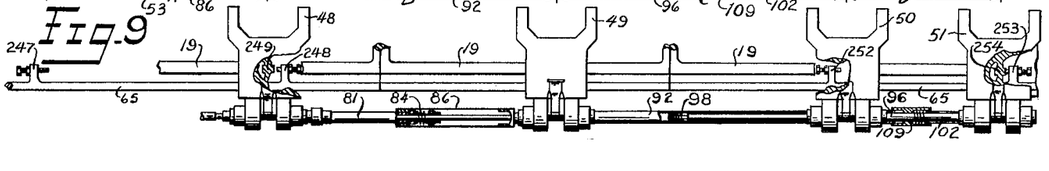
FIG. 9 is an enlarged fragmentary plan view of the transfer mechanism, with the last pallet engaging fork positioned adjacent the loading station.

At the start of a transfer cycle, a plurality of pallet engaging forks 48, 49, 50 and 51 are in leftward retracted position. The transfer cycle includes rotating a transfer bar 53 operatively interconnected between the forks 48, 49, 50 and 51 for moving the forks inwardly to engage the ballets 38, 39, 40 and 41 respectively as shown in FIG. 1. After this, the transfer bar is moved longitudinally in a rightward direction to advance the forks and pallets to their next succeeding working stations, as shown in FIG. 9, after which the bar is rotated in a reverse direction to retract the forks. The transfer bar 53 and associated forks are then again moved longitudinally leftward prior to starting the next transfer cycle.

Figures 2, 4:
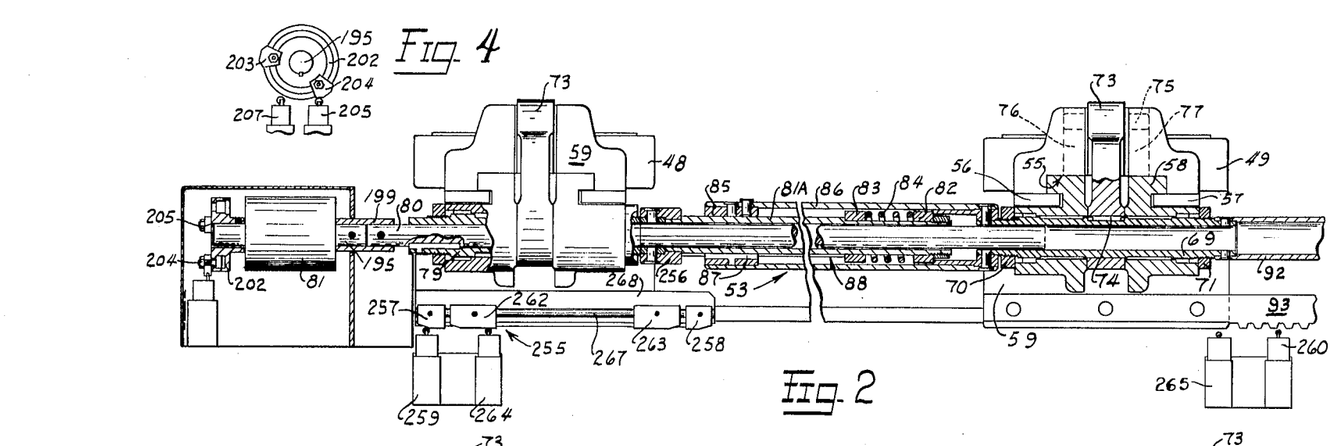
FIG. 2 is an enlarged fragmentary view, partly in front elevation and partly in longitudinal vertical section, of a portion of the transfer mechanism, showing the telescoping interconnection between the first two pallet engaging forks.
FIG. 4 is a fragmentary view in end elevation of an adjustable cam mechanism and associated switches operable to control axial movement of the transfer bar in coordinated relationship with rotational movement thereof.
Figures 5, 6, 7:
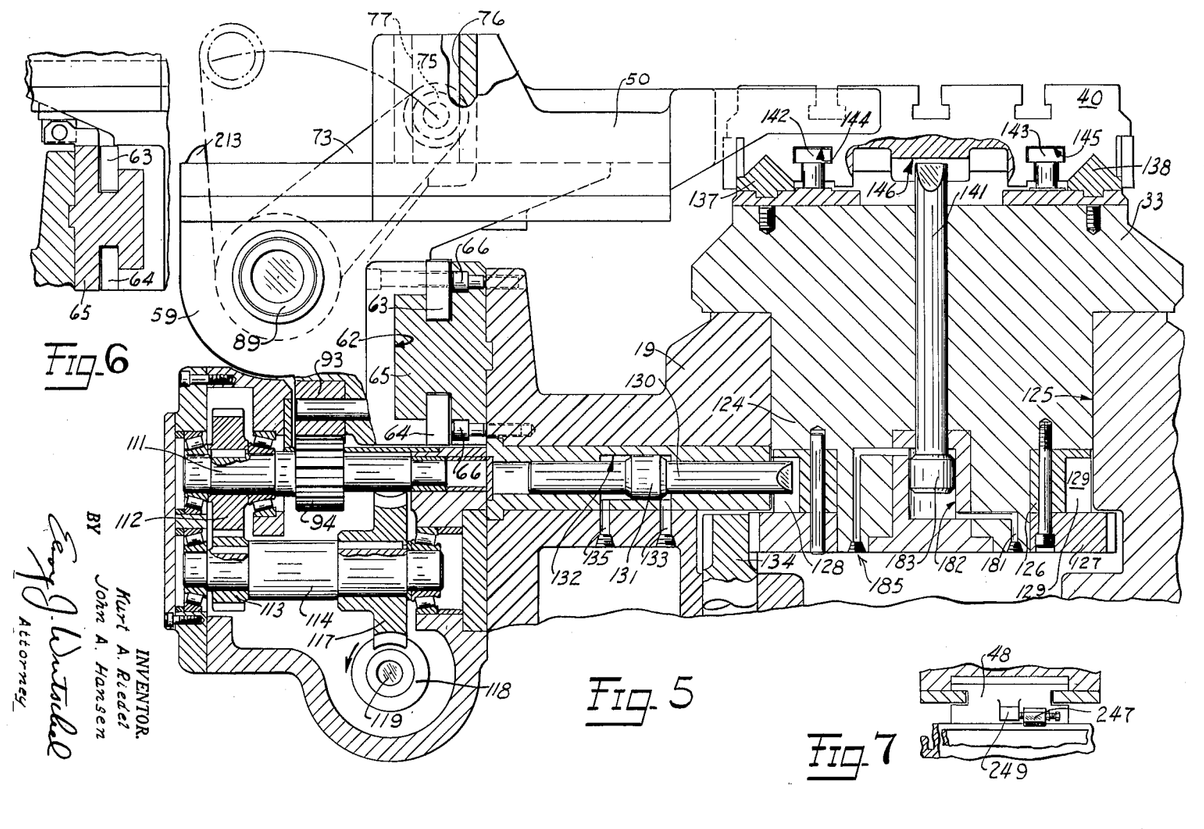
FIG. 5 is an enlarged fragmentary view, partly in elevation and partly in transverse vertical section through the transfer mechanism and an associated indexable support member, with certain parts broken away to show the internal mechanism.
FIG. 6 is an enlarged fragmentary view, partly in elevation and partly in transverse vertical section, showing a transfer stop abutment and taken generally along the lines 6—6 in FIG. 1.
FIG. 7 is an enlarged fragmentary detailed view, partly in elevation and partly in longitudinal section, showing a pallet stop abutmetnt and taken generally along the lines 7—7 in FIG. 1.

Inasmuch as the means for supporting and moving all of the pallet engaging forks are identical, only the fork 49 will be described in detail. As shown in FIG. 2, the fork 49 is provided with a rectangular guideway 55 fixedly constrained for transverse movement by gibs 56 and 57 to a transverse rectangular way 58 integrally formed with a fork support member 59. In a similar manner, the support member 59 is provided with a longitudinal rectangular guideway 62, as shown in FIG. 5, and is slidably secured by means of gibs 63 and 64 to a way structure 65 extending longitudinally of the bed 19 and removably secured thereto by means of cap screws 66. As shown in FIG. 1, the rectangular way structure 65 extends throughout the entire length of the multiple station machine to constitute a continuous guideway for the respective fork support members associated with pallet engaging forks 48, 49, 50 and 51. Toward its outer portion, the fork support member 59 is provided with an enlarged bored opening disposed to rotatably support a tubular drive member 69 constrained to rotate therein by means of thrust bearings 70 and 71. A crank arm 73 having a bored opening in its lower hub encircling the drive sleeve 69 is keyed thereto by means of a key 74. A crank pin 75 journalled in the upper end of the crank arm 73 is provided with outwardly extending ends slidably engaging vertical rectangular ways formed in the fork 49. Thus, rotation of the drive sleeve 69 operates to move the crank arm 73 for in turn effecting transverse movement of the pallet engaging fork 49.

In a similar manner, the crank arm 73 connected to move the fork 48 is keyed to the central portion of a tubular sleeve 79 journalled in the fork support member 59 associated with the first fork 48. The tubular sleeve 79 is slidably keyed to a longitudinally extending shaft 80 connected to be driven by a fluid motor 81. At its rightward end, the tubular sleeve 79 is pinned to an inner tubular sleeve 81A carrying at its outer end a thrust washer 82. The thrust washer 82 is spaced from a second thrust washer 83 by means of a spring 84. The inner sleeve 81A is slidably engaged by an axially movable thrust bearing 85 secured to one end of an outer telescoping tubular sleeve 86 that in turn is pinned at its opposite end to the tubular sleeve 69 journalled in the fork support 59 associated with fork 49. A key 87 carried by the thrust bearing 85 engages a longitudinal keyway 88 formed in the periphery of the inner sleeve 81A. As shown in FIG. 2, it will be apparent that rotation of the input drive shaft 80 effects simultaneous rotation of both the tubular drive shafts 79 and 69 for effecting simultaneous transverse movement of the respective pallet engaging forks 48 and 49.

Figure 3:
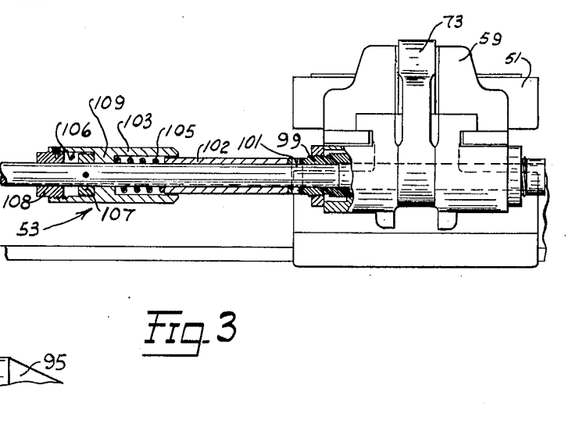
FIG. 3 is an enlarged fragmentary view, partly in front elevation and partly in longitudinal vertical section of another portion of the transfer mechanism and showing the telescoping interconnection between the last two pallet engaging forks.

As shown in FIG. 3, a rotatable tubular drive sleeve 89 journalled within the fork support member 59 is keyed at its central portion to the crank arm 73 connected to effect transverse movement of the fork 50. At its leftward end, the tubular drive sleeve 89 is fixedly secured to a single torque tube 92 that is pinned at its opposite end to the tubular drive sleeve 69 associated with the fork 49 as shown in FIG. 2. A longitudinally extending rack 93 is fixedly secured at its opposite ends to the fork support members respectively disposed to support the pallet engaging forks 49 and 50. The rack 93 is disposed to meshingly engage a rotatable pinion 94 connected to be driven by a fluid actuated motor 95. The tubular drive sleeve 89 is slidably keyed to the periphery of a shaft 96 that is resiliently cushioned against leftward axial movement by means of a thrust washer 97 pinned to the shaft and a compression spring 98.

Another tubular drive sleeve 99 journalled in the rightward fork support 59 is keyed to the crank arm 73 for actuating the associated right fork 51. At its leftward end, the drive sleeve 99 is secured to a short sleeve 102 and to the shaft 96 by means of a pin 101. The opposite end of the tubular shaft 102 is slidably engaged within an enlarged bored opening formed in a coupling 103. A spring 105 within the bored opening is seated between the end face of the sleeve 102 and the coupling 103. The coupling 103 is provided with another bored opening disposed to slidably engage a thrust washer 107 fixedly pinned to the rotatably driven shaft 96. A thrust abutment 108 is secured to the coupling 103 to limit leftward movement of the thrust washer 107 relative to the coupling member 103. The central portion 109 of the coupling member 103 is normally retained in resilient engagement with the thrust washer 107. During axial movement in either direction, the coupling 103 and spring 105 constitute a resilient interconnection between the support members respectively associated with the forks 50 and 51.

As shown in FIG. 5, the pinion 94 connected to drive the rack 93 is keyed to a shaft 111 having secured to its outer end a gear 112. The gear 112 in turn is driven by a cooperating pinion 113 keyed to the outer end of the rotatably journalled shaft 114 having secured to its opposite end a worm wheel 117. Power for driving the worm wheel 117 is derived from a worm 118 carried by a motor shaft 119 of the fluid motor 95, FIG. 8.

The arrangement for rotating the rotary table 33 as well as securing a pallet thereto is identical for each of the machines 14, 15 and 16. As shown in FIG. 5, the rotary table 33 is provided with a downwardly depending circular member 124 rotatably journalled within an enlarged vertically bored circular recess 125 formed in the bed 19. An index ring 126 provided with a plurality of circumferentially spaced index notches, and a ring gear 127 are secured to the lower end of the table member 124. Only two of the diametrically opposed index notches 128 and 129 are shown in FIG. 5, the notch 128 being engaged by a radially retractable index plunger 130 slidably carried by the bed 19. For effecting selective radial movement, the plunger 130 has secured to its central portion a piston 131 slidably constrained in a hydraulic cylinder 132. Applying hydraulic pressure to a line 133 by means of a control system (not shown) effects retraction of the plunger 130 to permit indexable movement of the table 33 upon rotation of a drive pinion 134 operatively engaging the ring gear 127. Both the radially movable index plunger 130 and drive pinion 134 constitute a part of an index control mechanism (not shown) connectable to effect selective indexable movement of the rotary table 33 relative to one or another of the tool spindles shown in FIG. 1.

Figure 8:
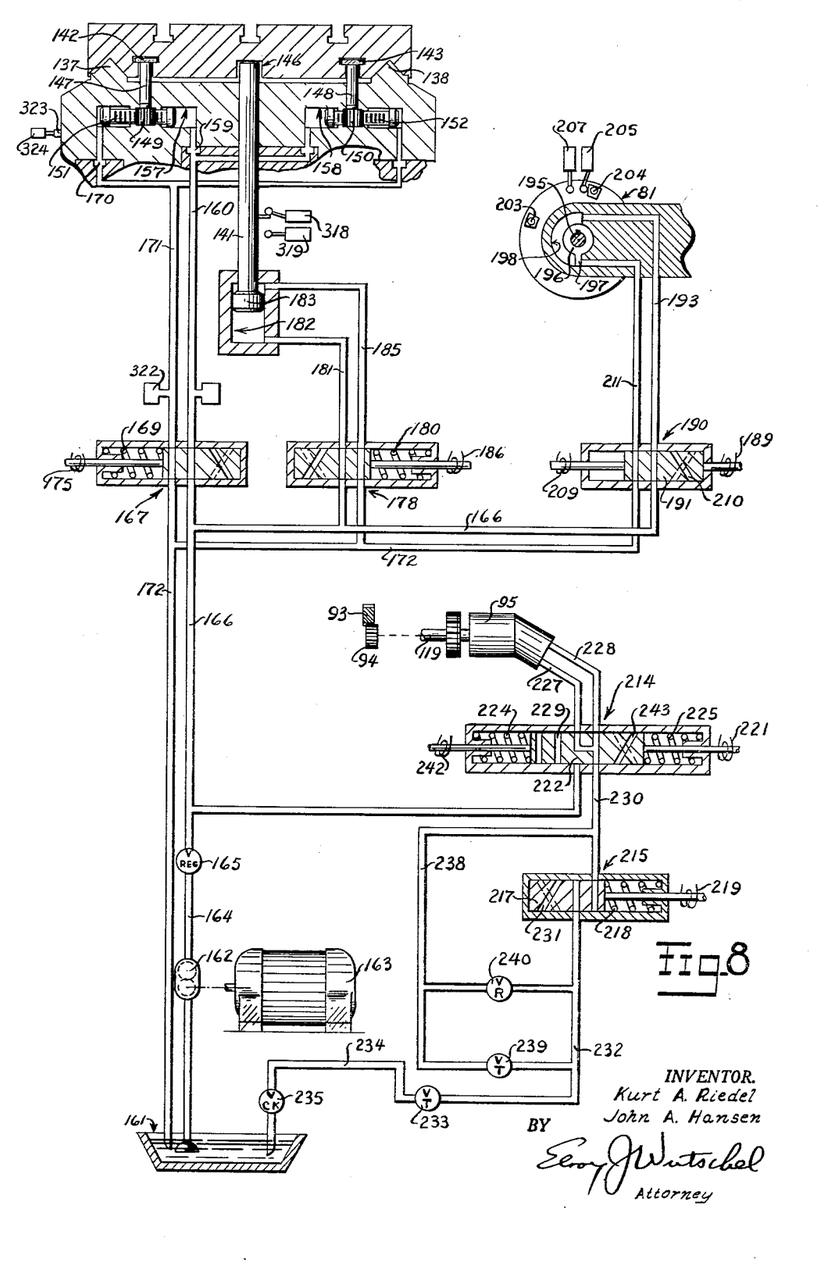
FIG. 8 is a schematic diagram illustrating the hydraulic circuit for actuating the transfer mechanism and clamping a work pallet to an indexable support.
Figure 11:
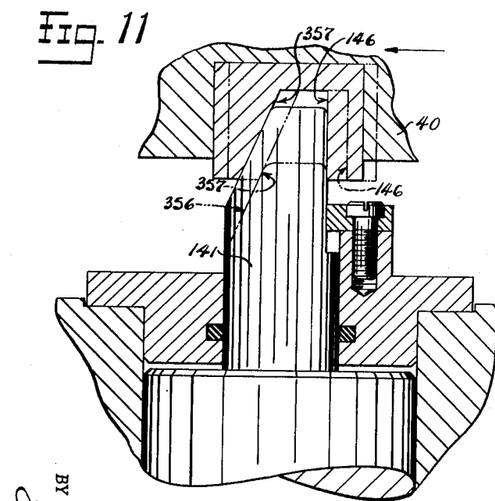

Prior to the start of a transfer cycle, fluid under pressure is directed through a line 135 to urge the plunger 130 inwardly into engagement with the notch 128, thus immovably locking the rotary table 33 in its 0° or "home" position. With this condition existing, as shown in FIG. 5, a pair of pallet receiving way surfaces 137 and 138 secured to the table 33 are aligned with the cooperating ways 34, 35 and 36, 37 carried by the bed 19. At the start of a transfer cycle, it is likewise necessary to effect downward retracting movement of pallet locating rod 141 and release of pallet clamps 142 and 143. The pallet clamps 142 and 143 are respectively disposed to engage inverted, parallel T-slots 144 and 145 formed in each of the pallets. With the locating rod 141 moved upwardly, the beveled upper end engages a locating notch 146 formed in the under side of the pallet 40, as shown in FIGS. 5 and 11. As shown in FIG. 8, the pallet clamps 142 and 143 are secured to vertically movable shafts 147 and 148 slidably carried for axial movement within a pair of spaced apart vertically bored openings in the table 33, and being restrained against rotation by means of keys (not shown). The lower ends of the shafts 147 and 148 are provided with threads adapted to be engaged by a pair of rotatable nuts 149 and 150 journalled in suitable recesses in the table 33. The outer peripheries of nuts 149 and 150 are provided with gear teeth engaged by axially slidable racks 151 and 152, respectively having their opposite ends fixedly secured to pistons constrained to slide within hydraulic cylinders 157 and 158 formed in the rotary table. With hydraulic fluid under pressure admitted from a line 160 via an annular collector groove 159, pressure fluid is transmitted to the inner ends of the cylinders 157 and 158 to urge the racks 151 and 152 outwardly. Outward movement of the racks rotates the nuts 149 and 150 to urge the clamp elements 142 and 143 downwardly, thus retaining the pallet in clamped position upon the table way surfaces 137 and 138.

As shown in FIG. 8, hydraulic fluid for actuating the various control valves is withdrawn from a sump 161 by a pump 162 driven by a motor 163. From the pump 162, fluid is transmitted via a hydraulic line 164 through a pressure regulating valve 165 to a main supply line 166. With a valve spool of a pallet clamp valve 167 urged rightwardly by means of a spring 169, the flow of fluid from line 166 continues through a port in the valve spool to the line 160, thereby clamping the pallet to the table 33. At the same time, fluid from the opposite ends of the cylinders 157 and 158 is exhausted via lines connected to an annular collector groove 170, a conductor 171, through a port in the valve spool 167 to an exhaust conductor 172 connected to return fluid to the sump 161.

Energization of a coil 175 effects leftward movement of the valve spool to connect pressure line 166 to line 171, thereby urging the racks 151 and 152 inwardly to release clamping pressure on the pallet. With this condition existing, fluid is exhausted from line 160 connected via the leftwardly moved valve spool to the main exhaust line 172.

In a similar manner, with a valve spool of a valve 178 moved leftwardly by a spring 180, fluid is transmitted from the main pressure supply line 166 via a port in the leftwardly moved valve spool to a hydraulic line 181. From the line 181, fluid under pressure is transmitted to a hydraulic cylinder 182 thereby urging a piston 183 secured to the lower end of the pallet locating rod 141 upwardly into engagement with the pallet notch 146. Fluid from the opposite end of the cylinder 182 is exhausted via line 185, through the leftwardly moved valve spool of valve 178 to the exhaust line 172. Energization of the solenoid 186 effects rightward movement of the valve spool to connect line 181 to exhaust line 172. At the same time, pressure fluid from line 166 is transmitted via a cannelure in the rightwardly moved valve spool to line 185 thereby effecting downward retracting movement of piston 183 and locating rod 141.

Prior to actuating the transfer mechanism for advancing the work pallets to their next succeeding stations, it will be apparent that solenoids 175 and 186 must be energized to unclamp each of the pallets and retract the locating rods 141.

For moving the forks into engagement with the work carrying pallets, a solenoid 189 of a valve 190 is energized to move a valve spool 191 rightwardly, as shown in FIG. 8. With the valve spool 191 in rightward position, as shown, hydraulic fluid from the main pressure supply line 166 is transmitted via a cannelure in the valve spool to a line 193 connected to actuate the fluid motor 81 for moving the forks inwardly. The motor 81 is provided with an output shaft 195 keyed to a rotatable drive member 196 journalled within the motor and provided with an integrally formed, laterally extending vane 197 carried for movement within an arcuate hydraulic chamber 198. Thus, with hydraulic fluid under pressure admitted from supply line 193 to the hydraulic chamber 198, the vane 197 is urged to rotate in a counterclockwise direction, as viewed in FIG. 8, to effect a corresponding movement of the output shaft 195. As shown in FIG. 2, the motor output shaft 195 is secured to the outer end of the shaft 80 by means of a coupling 199 in a manner to rotate the telescoping transfer bar 53 for effecting a simultaneous rotation of the crank arm driving sleeves 79, 69, 89 and 99.

As shown in FIGS. 2 and 4, a cam ring 202 is secured to the outwardly extending end of the motor shaft 195, and is provided with two adjustably positionable cam lobes 203 and 204. With the motor 81 actuated to effect inward fork movement, the cam ring 202 is rotated in a direction to move cam lobe 204 into actuating engagement with a switch 205. Actuation of switch 205, whenever the forks are in engaged position, closes an interlocking circuit to condition the control system for effecting rightward transfer movement of the rack 93 and pallet forks, as will hereinafter be more fully explained.

Actuation of motor 81 in a reverse direction to retract the respective forks from engagement with the pallets effects a corresponding rotation of cam ring 202 to move the cam lobe 203 into engagement with an interlocking switch 207. Whenever the switch 207 is initially actuated in response to retraction of the pallet engaging forks, the control circuit is conditioned to effect a reverse or leftward return movement of the rack 93, as well as the associated fork members.

To effect fork retracting operation of the motor 81 during a transfer cycle, solenoid 189 is de-energized and simultaneously therewith a solenoid 209 is energized to effect leftward movement of valve spool 191. With the valve spool 191 moved leftwardly, the line 193 is connected via a cannelure in the valve spool to the exhaust line 172. At the same time, pressure fluid from the main supply line 166 is transmitted via a line 210, to a hydraulic line 211 connected to supply fluid to the chamber 198, thereby effecting clockwise movement of the vane 197, and motor shaft 195, as shown in FIG. 8.

For effecting either rightward transfer or leftward return movement of rack 93, a directional hydraulic valve 214 is operated in coordinated relationship with a rate change valve 215. Whenever a valve spool 217 of the valve 215 is urged leftwardly by spring 218, the control system is conditioned for a slow creep rate of movement in either direction. Energization of a solenoid 219, however, effects rightward movement of the valve spool 217 to permit rapid movement of the transfer mechanism.

Immediately after the motor 81 is actuated to effect inward movement of the pallet forks 48, 49, 50 and 51, a solenoid 221 of the directional valve 214 is energized along with the rate change solenoid 219 to initiate rightward transfer movement at a rapid rate. Energization of the solenoid 221 effects rightward movement of a valve spool 222 from its normal resiliently biased neutral position as determined by springs 224 and 225. With this condition existing, a hydraulic circuit is completed from the main pressure supply line 166, through a port on the valve spool 222 to a line 227 connected to actuate the fluid motor 95 for effecting rightward transfer movement at a rapid rate. Fluid is exhausted from the motor 95 via a line 228, and thence via another cannelure 229 on the valve spool to a rate control line 230. Since the rate change solenoid 219 is energized, the valve spool 217 is moved rightwardly to complete a circuit from the line 230, a valve spool groove 231, a hydraulic line 232, a rapid rate throttle regulating valve 233 to an exhaust line 234. The return flow of fluid from exhaust line 234 continues through a check valve 235 to the sump 161.

Solenoids 219 and 221 are retained energized to continue rightward transfer movement at a rapid rate until the pallet engaging forks begin to approach their next stations. At this moment, solenoid 219 is de-energized to permit resiliently biased leftward movement of valve spool 217 thereby reducing the rapid transfer rate to a slow or creep rate of travel. The return flow of fluid from line 230 then continues via a line 238, a creep rate throttle regulating valve 239, connected to the line 232. Valve 239 is so adjusted as to restrict the return flow of fluid from the motor 120 in a manner to continue transfer movement at the slow rate of travel. To compensate for the sudden surge of pressure occurring upon de-energization of solenoid 219, a pressure regulating valve 240 is interconnected between hydraulic lines 238 and 232.

With the forks moving rightwardly at creep rate, subsequent de-energization of solenoid 221 permits resiliently biased return of valve spool 222 to its central spring biased neutral position to stop movement of motor 95. Upon stopping rightward transfer movement, fluid motor 81 is again energized to retract the forks from engagement with the respective work carrying pallets. As soon as the forks are fully retracted, the solenoid 219 and a solenoid 242 are simultaneously energized to initiate rapid leftward return movement of the transfer mechanism to its starting position. Energization of solenoid 242 effects leftward movement of valve spool 222 connecting pressure supply line 166 to transmit fluid via a valve spool cannelure 243 to the hydraulic line 228 connected to effect actuation of the motor 95 for moving the transfer mechanism leftwardly. With the transfer mechanism moving leftwardly to its starting position, the hydraulic line 227 is connected via a cannelure on the valve spool to the rate regulating hydraulic line 230. Subsequently, de-energization of solenoid 219 effects a reduction in leftward movement from a fast to a creep rate, with sequential deenergization of solenoid 242 effecting final stopping of rack 93. The respective forks 48, 49, 50 and 51 are then retained in their extreme leftward, retracted position and the entire control mechanism is conditioned for starting another transfer cycle of operation.

After the forks have been advanced to their approximate next positions by operation of the transfer mechanism, final precise positioning of the respective pallets is effected by upward movement of each locating rod 141 carried by the rotary tables associated with the machine tools 14, 15 and 16. As indicated in FIG. 11, the pallet 40 is stopped by the transfer mechanism at a point slightly short of being aligned with the locating rod 141. In this position, the pallet notch 146 is shown by the broken lines in FIG. 11. Final positioning movement is effected as the locating rod 141 is moved vertically upward in a manner that the cam surface 356 presented thereby engages the slightly displaced cooperating cam face 357 presented by the locating notch 146. As the rod 141 moves from fully retracted position upwardly into the broken line position shown, the pallet 40 is bodily displaced a slight distance until the rod reaches its full engaged position, as shown by the solid lines. In a similar manner, each of the other pallets simultaneously advanced into working position on the three spaced apart rotary tables provided for the machines 14, 15 and 16 is moved into final position by upward movement of the respective locating rods associated therewith.

A pair of adjustable positive stops 247 and 248 are secured to the way structure 65 in a manner to coact with a double faced abutment 249 integrally formed with the support member for fork 48, as shown in FIG. 9. In a similar manner, a pair of adjustable positive stops 252 and 253 are secured to the way structure 65 to coact with a double faced abutment 254 secured to the underside of the fork support for the extreme right fork 51. Thus, as shown in FIG. 9, the stop 253 engages abutment 254 to position the fork 51 adjacent the loading station 44. At this time, the splined shaft 96 telescopes within the hollow single torque tube 92. During leftward movement, as the fork 50 approaches the operating station for machine 15, the abutment 254 is moved into engagement with the positive stop 252, thereby positioning the fork 51 adjacent the working station for machine 16. The spring 98, FIG. 3, operates to cushion the initial impact between thrust washer 97 and drive sleeve 89 during leftward movement.

As shown in FIG. 9, however, the stop 248 does not engage abutment 249 to position the fork 48 adjacent the operating station for machine 14. Actually, the fork is positioned adjacent the operating station for machine 14 by means of a dog actuated trip mechanism 255, FIG. 2, as will hereinafter be more fully explained. The stop 248 functions merely as a safety device to positively preclude overtravel of the transfer mechanism in the event of malfunctioning of the trip mechanism 255. With the fork 48 properly positioned relative to machine 14, the inner opposed faces of thrust bearings 85 and 83, FIG. 2, are in abutting engagement, and the telescoping interconnection between forks 48 and 49 is fully extended without compressing spring 84. Leftward return movement of the fork 48 from its position shown in FIG. 9 does not begin until the fork 49 has moved leftwardly an appreciable distance. Actually, as shown in FIG. 2, the outer face of thrust bearing 85 engages a coupling member 256, thereby pushing the fork 48 into position adjacent the ready station 43. The ready station position is reached in response to the dog actuated trip mechanism 255 with the left positive stop 247 positioned to preclude any overtravel in a leftward direction.

To control actuation of the fluid motor 95 for limiting the extent of transfer mechanism movement in either direction, the trip mechanism 255 comprises a pair of stop dogs 257 and 258 that are adjustably secured to the support for the fork 48 in a manner to coact with stop switches 259 and 260 secured to the machine base. For changing from rapid to creep rate in either direction a pair of rate change dogs 262 and 263 are spaced inwardly from the stop dogs to coact with rate change switches 264 and 265 respectively. The stop dogs 257, 258 and rate change dogs 262, 263 are adjustably secured to a carrier rod 267 that is secured at its opposite ends to an elongated plate 268 carried by the fork support for the left fork 48.

During leftward return movement of the transfer mechanism, the rate change dog 262 actuates the switch 264 for reducing the rate of travel from rapid to creep speed. Shortly after this, the stop dog 257 actuates switch 259 to de-activate the fluid motor 95. Conversely, during rightward transfer movement, the rate change dog 263 actuates the switch 265 slightly in advance of stop dog 258 actuating stop switch 260.

Figure 10:
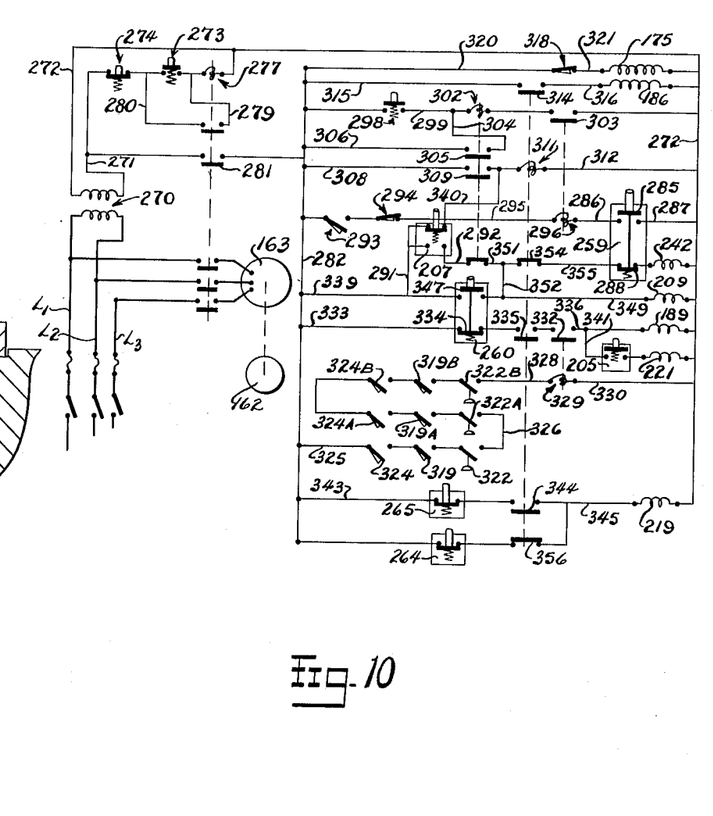
FIG. 10 is a schematic circuit diagram illustrating the electrical control circuit for effectuating an operating cycle of the transfer mechanism; and, FIG. 11 is an enlarged fragmentary detailed view, partly in elevation and partly in longitudinal section, of the pallet locating rod and pallet notch.

Power for energizing a control circuit for operating the transfer mechanism is derived from the usual three phase source connected via a fused disconnect switch to energize supply conductors $L_1$, $L_2$ and $L_3$. Conductors $L_1$ and $L_2$ are connected to energize the primary winding of the transformer 270, the secondary of which is connected to supply current at reduced voltage to conductors 271 and 272. Depressing a master start button switch 273 completes a circuit from energized conductor 271, a normally closed contact bar of a stop switch 274, through the coil of a master relay 277 connected at its opposite terminal to conductor 272. A holding circuit for retaining relay 277 in upward closed position is then completed via a conductor 279, the closed upper contact bar of the relay to a conductor 280. With the relay 277 in energized closed position, the conductor 271 is connected via closed contact bar 281 to energize conductor 282. At the same time, movement of the three lower contact bars of relay 277 to upward closed position completes a circuit for transmitting current from line conductors $L_1$, $L_2$ and $L_3$ to energize the motor 163 for driving the pressure pump 162.

Assume now that the telescoping transfer bar 53 is in its extreme leftward position and the respective pallet engaging forks 48, 49, 50 and 51 are retracted. With this condition existing, the reverse rate change switch 264 is in open position due to its being engaged by rate change dog 262, FIG. 2. Likewise, reverse stop switch 259 is actuated by stop dog 257 to retain an upper contact bar 285 in bridging engagement between conductors 286 and 287. The normally closed lower contact bar 288 of the switch 259 is in open position. With the forks in retracted position, the switch 205 is in normally open position as shown in FIG. 10. However, the switch 207 is actuated by engagement with cam lobe 203 to urge the contact bar thereof into downward bridging engagement between conductors 291 and 292.

A normally open switch 293 is actuated to closed position by movement of a pallet to the ready station 43, FIGS. 1 and 10. Likewise, movement of a pallet from the loading station 44 by conveyor 45 permits return of a normally closed interlocking switch 294 to closed position as shown in FIG. 10. An interlocking circuit permitting initiation of the transfer cycle is then completed from conductor 282, via the closed contact bars of interlocking switches 293, 294 to a conductor 295. This circuit continues from conductor 295 to the coil of a relay 296, conductor 286, the dog actuated closed contact bar 285 to the conductor 287. Whenever the relay 296 has been energized to upward closed position, as described, a transfer cycle may be initiated by momentarily depressing a transfer start button switch 298. Closure of switch 298 completes a circuit from conductor 282, conductor 299, through the coil of a transfer start relay 302, the energized closed contact 303 to conductor 272. A holding circuit for retaining relay 302 in energized closed position is then completed via a conductor 304, the closed contact bar 305, conductor 306 connected to control conductor 282.

Energization of transfer start relay 302 completes another circuit from conductor 282, via a conductor 308, upwardly closed contact bar 309 through the coil of a relay 311 to a conductor 312 connected to the control conductor 272. Energization of the relay 311 to upward closed position operates first to complete circuits for unpinning and unclamping the work carrying pallets. As shown in FIGS. 8 and 10, the first of these circuits extends from conductor 282, through a conductor 315, the upwardly closed contact bar 314, to a conductor 316 connected to energize the solenoid 186 for retracting the pallet locating rod 141. As the locating rod 141 is retracted by operation of piston 183, an interlocking switch 318 is moved to its normally closed position, and a normally open interlocking switch 319 is moved to closed position. Thus, a parallel circuit is established from conductor 282, via a conductor 320, normally closed interlocking switch 318, a conductor 321 to energize the pallet unclamp solenoid 175. With solenoid 175 energized, the valve spool of the valve 167 is moved leftwardly to transmit pressure fluid from the hydraulic supply line 166 to the unclamp supply line 171. As soon as the pallet is fully unclamped, pressure in the line 171 operates an interlocking fluid actuated switch 322.

At the start of any transfer cycle, as hereinbefore explained, it is necessary that the table be positioned in its 0° or "home" position in order that the table ways 137, 138 are properly aligned with the associated bed ways. Whenever the table is in its "home" position, a dog 323 secured thereto actuates another interlocking switch 324 to closed position. As viewed in FIG. 10, closure of the respective interlocking switches 324, 319 and 322 associated with the rotary table 33 for the machine 15 operates to complete a series circuit from conductor 282, a conductor 325 through the closed switches to a conductor 326. Before transfer movement can take place, however, it is necessary that identical conditions be established for the rotary tables respectively associated with the machine 14 and machine 16. Therefore corresponding interlocking switches 324A, 319A, 323A and 324B, 319B and 323B are interconnected in series between the conductor 326 and a conductor 328. Thus, whenever all of the rotary tables associated with machines 14, 15 and 16 are in "home" position, and the pallets carried thereby are unpinned and unclamped, a circuit will be completed from conductor 325 to conductor 328 through the coil of a relay 329 to a conductor 330 connected to energized conductor 272.

Closure of a contact bar 332 of the relay 329 in turn completes a circuit for moving the pallet engaging forks inwardly. This circuit is completed from conductor 282, a conductor 333, a normally closed contact bar 334 of switch 260, an upwardly closed contact bar 335 of energized relay 311, the closed contact bar 332 to a conductor 336. From the conductor 336 the current continues to energize solenoid 189 connected at its opposite terminal to energized conductor 272. Energization of solenoid 189, FIG. 8, actuates valve 190 to operate the fluid motor 81 for rotating the transfer bar to simultaneously move the forks into engagement with the pallets. As this happens, movement of the dog 203 permits the switch 207 to return to its normally closed position. Movement of the switch 207 to its normally closed upward position completes an overlapping circuit from conductor 282, a conductor 339, conductor 291, the closed contact bar of switch 207 to a conductor 340.

As soon as the forks are fully engaged, the cam lobe 204 actuates switch 205 to closed position, FIGS. 8 and 10. Closure of switch 205 in turn completes a circuit from energized conductor 336, a conductor 341, the closed switch 205 to energize the rightward transfer solenoid 221. Fluid motor 95 is thereby activated to initiate rightward transfer movement of the work carrying pallets to their next succeeding stations. Rightward movement of the first pallet 38 from the ready station deactivates switch 293, FIG. 10, to open, thus interrupting the circuit from conductor 282 to conductor 295. This in turn effects de-energization of relay 296, and downward movement of the associated contact bar 303 interrupts another holding circuit to de-energize the transfer start relay 302 which thereby drops to downward open position. As this occurs however, the relay 311 is retained in energized upward position through the overlapping holding circuit which had been initially established via conductor 340 upon return movement of switch 207 to its upward closed position. It will be apparent that rightward transfer movement is initiated and continues at a rapid rate due to the fact that the rate change solenoid 219 is energized immediately upon closure of relay 311. The rapid rate control circuit is completed from conductor 282, via a conductor 343, the normally closed rate change switch 265, a closed contact bar 344 of energized relay 311 to a conductor 345. Rapid rightward transfer movement continues until the rate change dog 263, FIG. 2, actuates the rate change switch 265. Actuation of switch 265 to open position in turn de-energizes solenoid 219, permitting resiliently biased leftward movement of valve spool 217, FIG. 8, to initiate the slow or creep rate of travel. As soon as the pallets have reached their approximate final location, the stop dog 258 actuates switch 260 thereby moving the lower contact bar 334 to downward open position. Downward movement of contact bar 334 simultaneously interrupts the circuits to the "fork in" solenoid 189 and the "transfer right" solenoid 221. At the same time, an upper contact bar 347 associated with the switch 260 is moved into bridging engagement between conductors 339 and 349. With the contact bar 347 momentarily retained in closed position, a circuit is completed from conductor 282, conductor 339, contact bar 347, conductor 349 to energize the solenoid 209. As hereinbefore explained, energization of solenoid 209 effects leftward movement of the valve spool 191, FIG. 8, to activate the fluid motor 81 for retracting the pallet engaging forks 48, 49, 50 and 51.

As the forks are being retracted, movement of the cam lobe 204 permits the interlocking switch 205 to return to its normally open position. Subsequently, the cam lobe 203 actuates the switch 207 to closed position, thereby immediately completing an overlapping shunt circuit to the solenoid 209. The shunt circuit extends from conductor 339, the conductor 291, the downwardly moved contact bar of switch 207, to a conductor 292. The overlapping circuit continues through the normally closed lower contact bar of relay 302 and thence through conductors 351, 352 to the conductor 349. The overlapping shunt circuit through the downwardly actuated switch 207 is necessary to retain solenoid 209 energized after reverse transfer movement has been initiated and switch 260 returns to its normally open position.

It will be apparent that actuation of switch 207, whenever the forks are fully retracted, interrupts the holding circuit from conductor 291 to conductor 340 thereby de-energizing the relay 311. Movement of relay 311 to downward open position completes a circuit from conductor 351, a contact bar 354, a conductor 355, the normally closed contact bar 288 of switch 259 to energize solenoid 242 for effecting reverse or leftward movement of the transfer mechanism to its starting position. At the same time, another circuit is simultaneously established to energize the rate change solenoid 219 in a manner that return movement will begin at a rapid rate. This circuit is completed from conductor 282, the normally closed rate change switch 264, a normally closed contact bar 356 of the relay 311 to the conductor 345 connected to the solenoid 219. In addition to initiating return movement of the transfer mechanism to its starting position at a rapid rate, de-energization of relay 311 likewise conditions the control system for finally locating and re-clamping the pallets to the respective rotary tables. Movement of the upper relay contact bar 314 to open position interrupts the holding circuit to solenoid 186, permitting resilient operation of the valve 178, FIG. 8, to urge the locating rod upwardly. As shown by the broken lines in FIG. 11, a bevelled cam surface 356 presented by the upper end of locating rod 141 engages a complementary cam surface 357 presented by the index notch 146. Thus, the locating rod is moved from retracted position, through the broken line position, into its uppermost position, indicated by the solid lines, final positioning movement of the pallet is effected. With the locating rod 141 retained in upward engaged position, the switch 318 is actuated to open position to de-energize pallet unclamping solenoid 175 for securely clamping the pallet to the table. Each of the rotary tables is provided with a locating rod of identical construction and operation to effect final precise positioning of the work carrying pallets respectively moved into operating position relative to the three machines 14, 15 and 16 by operation of the transfer mechanism.

Leftward return movement of the transfer mechanism continues at a rapid rate until the rate change dog 262 actuates the switch 264 to open position, thus de-energizing the solenoid 219 to initiate continued return movement at creep rate. Shortly after this, the stop dog 257 actuates stop switch 259 to open position, moving the lower contact bar 288 downwardly to interrupt the circuit from energized conductor 355 to the transfer motor control solenoid 242. With the switch 259 retained in engagement with the stop dog 257, the upper contact bar 285 thereof is again moved into bridging engagement with conductors 286 and 287 to condition the control system for initiating the next transfer cycle.

While the invention has been shown and described as applied to the transfer of work carrying pallets in a multi-station machine tool, it is to be understood that it may be incorporated with equal advantage for transferring pallets or workpieces in any type of in-line transfer machine. Although particular structures have been shown and described in considerable detail as exemplary of the manner in which the invention may be practiced, it will be apparent to those skilled in the art to which the invention relates that various modifications of the structures herein shown may be effected without departing from the spirit and scope of the invention as defined in the subjoined claims.

The principles of this invention having now been fully explained in connection with the foregoing description, we hereby claim as our invention:

1. In a machine tool, a base, a plurality of spaced apart power driven tool spindles, a plurality of indexable work supports carried by said base respectively associated with said tool spindles, each of said indexable supports provided on its upper surface with guideways, guideways carried by said base operatively interconnected between said indexable supports in a manner to cooperate therewith to provide a continuous transfer pathway, a plurality of work pallets respectively adapted to be advanced by said continuous transfer pathway into successive operating positions upon said supports, a separate transfer way carried by said base in spaced parallelism to the continuous pallet guideway presented thereby, a plurality of spaced apart transfer supports carried by said separate transfer way for selective longitudinal movement, a plurality of pallet engaging members respectively disposed to be movably carried by said transfer supports for rectilinear movement into engagement with said pallets in a plane transverse to the axis of their longitudinal movement, a rotatable telescopingly interconnected transfer bar interconnected between said transfer supports and being connected to effect simultaneous rectilinear movement of said pallet engaging members relative to said transfer supports and into engagement with said pallets, said transfer bar being reversibly rotatable to retract said pallet members from engagement with said pallets, power operable means including cycle control means being selectively actuatable to rotate said bar in one direction for moving said pallet members into engagement with said pallets, to move said bar longitudinally in one direction for advancing said pallets to successive stations, to rotate said bar in an opposite direction for moving said pallet engaging members to retracted position, and to move said bar longitudinally in the opposite direction for returning said transfer supports and said pallet engaging members to their starting positions, and means carried by said base operatively disposed to vary the extent of longitudinal movement of one of said transfer supports relative to the movement of said work supports.

2. In a machine tool, a frame provided with a plurality of differently spaced apart working stations, said frame presenting a transfer guideway operatively interconnecting the working stations presented thereby, a plurality of work pallets carried by said transfer guideway for sequential advancement into the working stations, a separate guide member secured to said frame in spaced relationship to said transfer guideway, a plurality of movable supports carried by said guide member for longitudinal movement, a plurality of pallet engaging forks respectively carried by said supports for rectilinear movement in a plane transverse to said guide member, a plurality of rotatable shafts respectively journalled in said supports and connected to effect rectilinear movement of said forks, a plurality of tubular shafts respectively interconnected between said shafts to cooperate therewith in a manner to constitute a single telescoping transfer bar, first power operable means connected to rotate one of said shafts in one direction for moving said forks into engagement with said pallets, said first means being selectively reversible to retract said forks, second power operable means connected to effect axial movement of one of said supports in one direction when said forks are engaged with said pallets and in the opposite direction when said forks are retracted, control means including a cycle start switch connected to effect a sequential operation of said first and second power operable means, and stop means carried by said frame in position to limit the extent of longitudinal movement of one of said movable supports.

3. In a transfer mechanism for a machine tool provided with a plurality of spaced apart working stations, a transfer pathway presented by said machine for moving work pallets to the spaced apart working stations therealong, a separate transfer guideway carried by said machine in spaced parallelism to said pallet transfer pathway, a plurality of work pallets carried by said transfer pathway for movement into the working stations, a plurality of supports movably carried by said transfer guideway, a plurality of pallet engaging members respectively carried by said supports for rectilinear movement into engagement with said pallets, said members being retractable from engagement with said pallets at the completion of a pallet transfer movement for returning said supports and said members to a starting position, a rotatable and axially movable telescoping bar interconnected between said supports and being connected to effect simultaneous rectilinear movement of said members into engagement with or into a retracted position relative to said pallets, power operable control means including a cycle start switch operatively connected to effect sequential rotatable and axial movement of said transfer bar throughout a predetermined cycle of movements for advancing said pallets to successive working stations and for retracting said forks and returning them to a starting position as a prerequisite for starting the next transfer cycle, and means for selectively limiting the extent of longitudinal movement of one of said supports.

4. In a multi-station machine tool provided with a transfer way and a plurality of work pallets carried by said transfer way for movement to successive working stations, a transfer mechanism comprising a longitudinally extending guideway, a plurality of supports movably carried by said guideway for longitudinal movement therealong, a plurality of rotatable shafts respectively journalled in said separate supports for rotation about a common axis parallel to the longitudinal path of support movement, a plurality of transfer members respectively carried by said supports for rectilinear movement in planes transverse to the longitudinal path of support movement, said members being respectively connected to be moved in a rectilinear plane by rotation of said shafts respectively associated therewith, a plurality of tubular shafts operatively connected between said support shafts to constitute a single rotatable and axially movable selectively extensible transfer bar, first power operable means actuatable to rotate one of said tubular shafts for simultaneously extending said rectilinearly movable member into engagement with said pallets, said first power means being reversibly rotatable to retract said members, and second power operable means connected to effect axial movement of one of said supports, circuit control means including a source of energy and a cycle start switch connected to activate said first power source and said second power source in predetermined sequence for transferring said pallets to operating stations along said transfer way, and adjustable means positionable to selectively vary the relative longitudinal movement of said separate supports.

5. In a multiple station machine tool, a plurality of spaced apart operating stations respectively provided with power driven tool spindles carried for relative feeding movement, a continuous trackway interconnected between said operating stations in work engaging proximity to one of the relatively movable tool spindles, an index table journalled in each of said working stations for selective indexable movement about an axis perpendicular to said trackway, a plurality of work supporting pallets slidably carried by said trackway for successive advancement to the respective operating stations and upon said index tables, a separate longitudinally extending guide member carried in space parallelism relative to said pallet supporting trackway, a plurality of separate supports slidably carried by said guide member for coordinated longitudinal movement in either direction therealong, a plurality of pallet engaging forks respectively carried by said supports for rectilinear movement into engagement with said pallets, a plurality of rotatable drive members journalled in said supports and connected to be simultaneously rotated in one direction for moving said forks into engagement with said pallets, said rotatable shafts being oppositely rotatable to move said forks to retracted disengaged position relative to said pallets for permitting independent indexable movement of said pallets together with said index tables respectively associated therewith, a nonextensible shaft interconnected between two of the rotary shafts journalled to rotate in two of said supports, a plurality of telescopingly interconnected tubular shafts operatively interconnected between the outer ends of the rotary shafts connected to said nonextensible shaft to the adjacent rotatable shafts journalled in said other supports, all of said rotatable shafts cooperating to constitute a continuous rotatable and axially movable transfer bar, power operable means connected to reversibly rotate one of the said shafts comprising said continuous transfer bar, power operable means connected to effect longitudinal movement of the two of said supports carried a fixed distance apart by said nonextensible shaft, positive stops associated with the telescopingly interconnected ones of said supports to respectively limit their range of longitudinal movement, a control system operatively connected to sequentially activate said power sources in a manner that said forks are moved into engagement with said pallets and said two fixedly spaced supports are moved a predetermined distance along said guide member and said telescopingly secured supports are moved different distances therealong.

6. In a machine tool; a base; a plurality of spaced apart power driven tool spindles movably carried in spaced apart positions upon said base for selective individual tool feeding movement; a plurality of indexable work supports journalled in spaced apart positions upon said base in a manner to be respectively associated with said spaced apart tool spindles; said indexable supports being provided with guideways adapted to be moved into parallel longitudinal alignment; said base presenting a plurality of spaced apart guideways interconnected between said indexable supports in a manner to cooperate therewith to provide a continuous transfer pathway; a plurality of work pallets connected to be advanced upon said continuous transfer pathway in a manner to be respectively moved into operating positions upon said indexable supports; releasable positioning and clamping means operable to secure said pallets to said respectively associated indexable supports; a separate guide member carried by said base in spaced parallelism to the continuous pallet receiving transfer pathway presented thereby; a plurality of separate transfer supports carried by said guide member for coordinated longitudinal movement; a plurality of retractable pallet engaging forks respectively carried by said separate transfer supports for rectilinear movement in a plane transverse to the plane of longitudinal support movement; a rotatable telescopingly interconnected transfer bar operatively interconnected between said transfer supports and operatively connected to effect a simultaneous longitudinal movement of said transfer supports in either direction; said transfer bar being operably connected to effect rectilinear pallet engaging movement of said forks or rectilinear retracting movement of said forks; and a control system including power operable means and a cycle start control selectively actuatable to sequentially rotate said bar to engage said forks with said pallets, to move said bar longitudinally for advancing said work pallets to the spaced apart indexable supports, to actuate said positioning and clamping means for securing said pallets to said index supports, to rotate said bar in an opposite direction for retracting said forks, and to urge said bar longitudinally in the opposite direction for returning said transfer supports and said forks to their respective starting positions.

7. In a machine tool provided with a transfer guideway, a work pallet movable carried by said guideway for selective movement therealong, a separate guide member carried in spaced apart relationship to said transfer guideway, a support member carried by said guide member for longitudinal movement, a fork slidably carried by said support member for rectilinear movement into engagement with said work pallet, said fork being retractable from engagement with said pallet, a shaft supported for rotational and axial movement and connected to produce movement of said fork and said support member, separate power operable means respectively connected to rotate said shaft for moving said fork and to move said shaft axially to effect axial movement of said support in either direction, an electro-hydraulic control system actuatable for rotating said shaft to move said fork into engagement with said pallet and to move said shaft axially for effecting axial movement of said support in one direction, a stop dog adjustably secured to said support member and a reversing switch engageable with said stop dog and operative to rotate said shaft for sequentially retracting said fork and effecting reverse movement of said support member and said fork to the starting position.

8. In a machine tool provided with a transfer guideway and a rotary table indexable about an axis perpendicular to said guideway, a work pallet movably carried by said guideway for selective movement therealong into position upon said index table, a separate guide member carried in spaced apart relationship to said transfer guideway, a support member carried by said guide member for longitudinal movement, a fork slidably carried by said support member for rectilinear movement into engagement with said work pallet, said fork being rectilinearly retractable from engagement with said pallet in a manner to permit indexable movement of said pallet with said table, a shaft supported for rotational and axial movement and connected to produce movement of said fork and said support member, and separate power operable means respectively connected to rotate said shaft for sequentially moving said fork and effecting axial movement of said support member in either direction.

9. In combination with a machine tool provided with a transfer pathway and a work pallet movable therealong, a transfer mechanism comprising a longitudinally extending guide member, a guide support slidably carried by said member for longitudinal movement, a rotatable member journalled in said support for rotation about an axis parallel to the longitudinal path of support movement, a crank arm secured to said rotatable member for rotatable movement, a retractable fork slidably carried by said guide support for rectilinear movement in a plane transverse to the longitudinal path of support movement in a manner to be movable into engagement with said pallet, said fork presenting a vertically upstanding rearward face provided with a vertical trackway, a crank pin carried by the outer end of said crank arm in a manner to operatively engage the trackway presented by said fork, power operable means connected to reversibly rotate said rotatable member for rectilinearly moving said fork in selected direction, and second power operable means connected to move said support member longitudinally in one direction when said fork is engaged with said pallet, said second means being operable to move said support member in the opposite direction when said fork is retracted.

References Cited in the file of this patent
UNITED STATES PATENTS

| | | |
|---|---|---|
| 2,193,840 | Oberhoffken et al. | Mar. 19, 1940 |
| 2,659,157 | Aller | Nov. 17, 1953 |
| 2,745,167 | Cross | May 15, 1956 |
| 2,808,746 | Blomqvist | Oct. 8, 1957 |